April 22, 1930.  J. R. HICKS  1,755,395
TRANSMISSION POWER TAKE-OFF
Filed Sept. 14, 1928    2 Sheets-Sheet 1
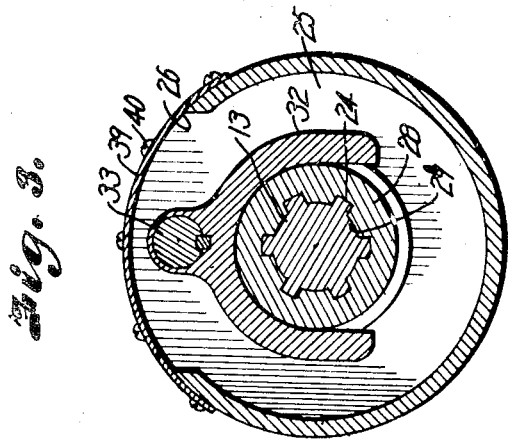
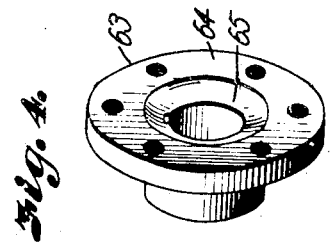
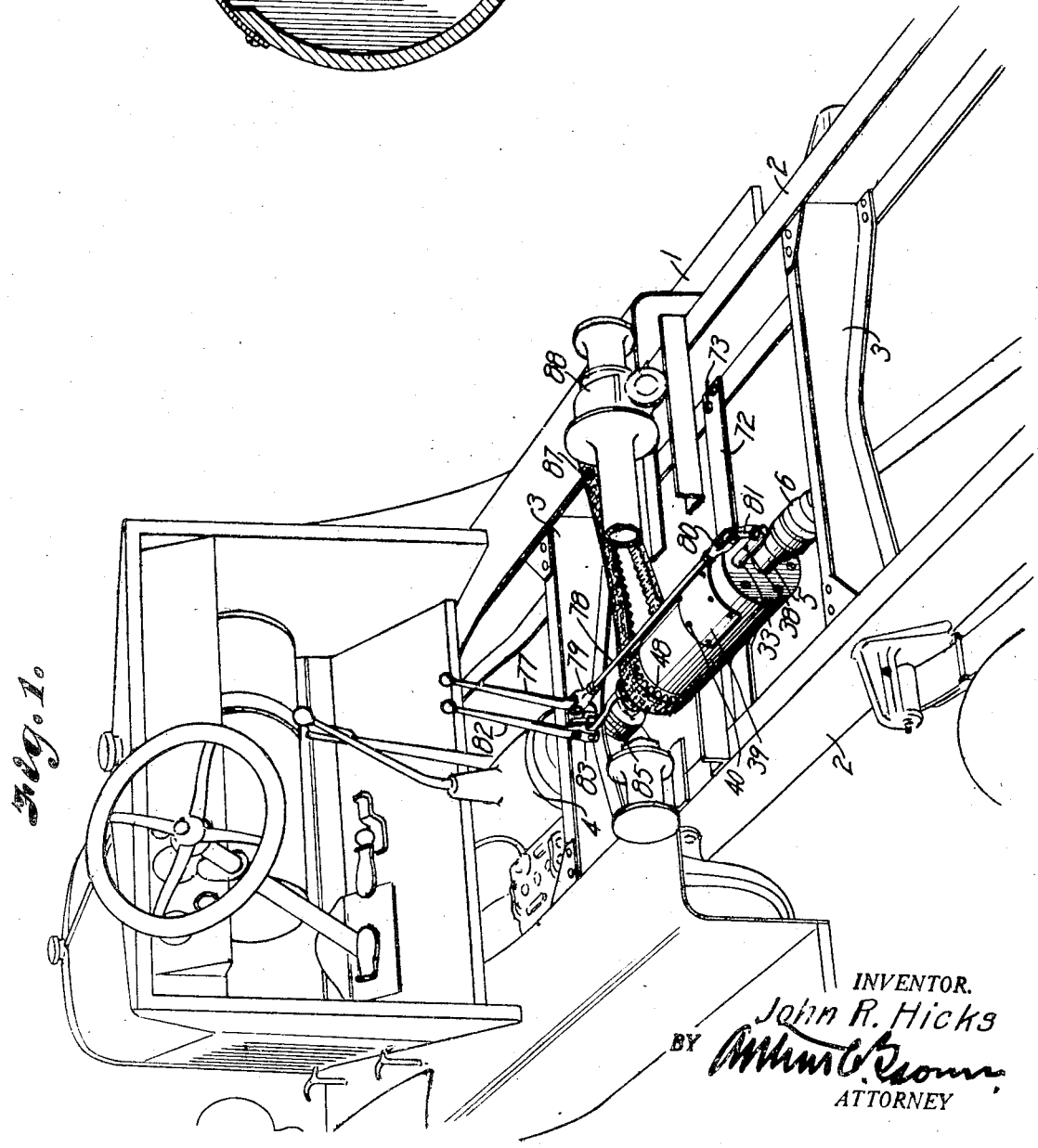
INVENTOR.
John R. Hicks
BY
ATTORNEY April 22, 1930.　　　　　J. R. HICKS　　　　　1,755,395
TRANSMISSION POWER TAKE-OFF
Filed Sept. 14, 1928　　　2 Sheets-Sheet 2
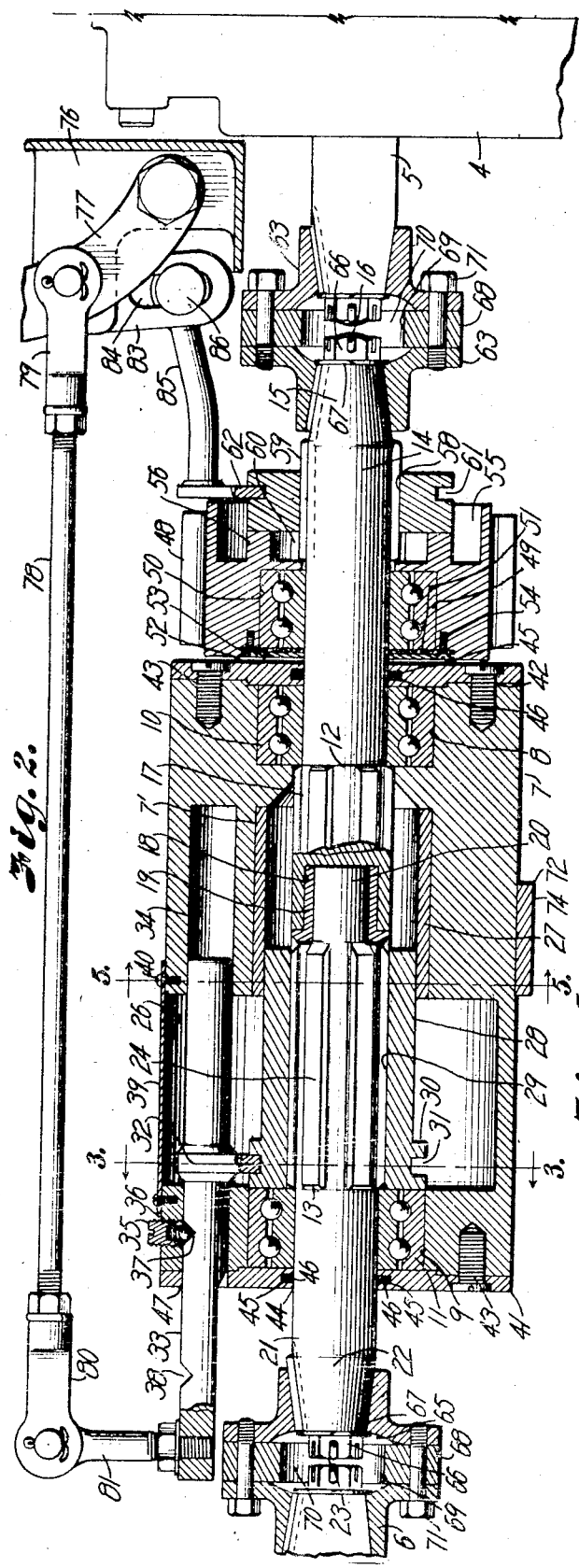

Patented Apr. 22, 1930

1,755,395

UNITED STATES PATENT OFFICE

JOHN R. HICKS, OF TULSA, OKLAHOMA, ASSIGNOR OF THREE-FOURTHS TO TIDAL OIL COMPANY, OF TULSA, OKLAHOMA, A CORPORATION OF OKLAHOMA

TRANSMISSION POWER TAKE-OFF

Application filed September 14, 1928. Serial No. 306,012.

My invention relates to power-transmitting apparatus and more particularly to power take-off mechanism, the principal object of my invention being to provide a device of this character whereby power from a truck motor or the like may be utilized for driving apparatus such as a winch or pump mounted on the truck chassis.

A further object of my invention is to provide such a device that may be operated independently of or simultaneously with the driving wheels, or permit a direct drive from the transmission to the rear wheels.

Another object of the invention is to provide a mechanism so designed that it may be interposed between the transmission and rear wheels for transmitting power to the driven apparatus through the same selective gear ratios used for driving the truck.

In accomplishing these and other objects of my invention I have provided improved details of structure, the preferred forms of which are illustrated in the accompanying drawings, wherein:

Fig. 1 is a perspective view of a power take-off embodying the invention on a truck chassis and operably connected to a driven apparatus.

Fig. 2 is a central vertical sectional view illustrating the manner of interposing the power take-off between the transmission and universal joint of a truck.

Fig. 3 is a vertical cross section on the line 3—3, Fig. 2.

Fig. 4 is a detail perspective view of a coupling flange such as used for connecting ends of the drive shafts.

Fig. 5 is a vertical cross-section on the line 5—5, Fig. 2.

Fig. 6 is a disassembled view in perspective of a driving sprocket and cooperating clutch member.

Referring in detail to the drawings:

1 designates a truck chassis having longitudinal frame members 2, connected and braced by cross-members 3, and 4 a transmission for selectively delivering power from the motor through a propeller shaft 5 and universal joint 6 to the differential and rear wheels.

The power take-off unit includes a cylindrical housing 7 provided at its front and rear ends with sockets 8 and 9, respectively, for seating bearings 10 and 11 carrying independent drive shaft sections 12 and 13, the drive shaft 12 comprising a relatively long smooth portion 14 terminating in a tapered end 15 having a reduced threaded portion 16. The splined rear end 17 of the shaft 12 is provided with a cylindrical socket 18 seating a sleeve 19 preferably of hardened material for receiving a reduced bearing end 20 of the shaft 13. The smooth rear end 21 of the shaft 13 is tapered as at 22 terminating in a threaded shank 23. The portion 24 of the shaft 13 between the bearing end 20 and rear end 21 is splined complementary to the splined end 17 of the shaft 12.

It is apparent that with the shaft sections 12 and 13 mounted in the bearings 10 and 11 the bearing end 20 permanently engages the sleeve 19 thereby maintaining the shafts in accurate alignment, yet permitting rotation of one section independently of the other.

To provide space for a shifting mechanism the housing 7 is cast with a relatively wide cylindrical recess 25 near its rear end having an upper open mouth 26. A central bore 7' in the housing, equal to the diameter of the bearing sockets 8 and extending forwardly from the recess 25 seats a cylindrical sleeve 27 preferably of hard metal for slidably receiving a shifting sleeve 28 having a splined axial bore 29 complementary to the splined portions of the shafts 12 and 13.

Formed on the rear end of the shifting sleeve is a flange 30 having an annular groove 31 engaging a shifting yoke 32 fixed to a shifting rod 33 slidable in a bore 34, parallel to, and spaced above, the shaft sections. Threaded in the rear end of the housing immediately above the rod 33 is a lock 35 including a spring urged ball 36 adapted to selectively engage one of a pair of spaced notches 37 and 38 in the upper edge of the rod.

From Fig. 2 it will be apparent that by sliding the rod 33 forwardly until the shift lock 35 engages the notch 38 the shifting sleeve 28 cooperating with the rod through the yoke 32 will also move forwardly engaging both of the splined portions of the shaft sections, thereby effecting a continuous integral shaft. When, however, the sleeve is moved back to the position illustrated, the shaft sections are free to rotate independently of each other.

The open mouth 26 is of sufficient width to permit mounting of the shifting yoke on the rod 33 and is normally closed by a cover 39, attached to the housing by means such as screws 40.

End plates 41 and 42 are attached to the housing by counter-sunk screws 43 and central bores 44 are provided with annular recesses 45 for receiving oil retaining rings 46. An aperture 47 in the end plate 41 aligns with the bore 34, the rod 33 extending through the aperture for attaching actuating means later described.

The smooth portion 14 of the shaft section 12 extends sufficiently from the forward end of the power take-off housing to carry a clutch and driving assembly, including a sprocket 48, rotatably supported on the shaft by a bearing 49, seating in a rear socket 50 of the sprocket. An oil retaining disk 51 and cover plate 52 mounted in a counter-sunk recess 53 are attached to the sprocket by screws 54.

Extending into the forward end of the sprocket to near the bearing socket 50 is a cylindrical recess 55 provided with forwardly projecting clutch jaws 56. A mating clutch member 57, having key-seats 58, is slidably mounted on the shaft portion 14, longitudinal keys 59 fixed on the shaft engaging the key-seats 58 to prevent rotation of the clutch member. Rearwardly projecting jaws 60 adapted to cooperate with the jaws 56 are provided on the member 57 and an annular groove 61 in the member receives a clutch fork 62 for moving the jaws 60 into and out of engagement with the jaws 56.

In order to interpose the power take-off unit between the transmission and universal joint, a section of the propeller shaft corresponding in length to the take-off is removed and provided with tapered ends like the ends 15 and 22 previously described. Coupling members 63 (Fig. 4), having annular facing flanges 64 provided with apertures 65, are keyed to the tapered ends of the shaft and castellated nuts 66 and lock washers 67 on the reduced threaded portions of the shafts secure the flanges to the tapered shaft ends. Annular spacing collars 68 provided with central openings 69 and spaced apertures 70 aligning with the apertures 65 in the coupling members are interposed between the facing flanges 64, bolts 71 extending through the aligning openings securely mounting the parts together. As illustrated, one of a pair of coupling members is provided with smooth apertures and the other with threaded openings for engaging the threads on the bolts 71.

Additional means for rigidly supporting the power take-off housing and retaining it in proper alignment with the other units of the chassis comprise an intermediate cross-member 72, supported from, and secured to the longitudinal frame members 2, by bolts 73. An arcuate saddle portion 74 of the cross member engages the lower surface of take-off housing and is fixed thereto by means such as bolts 75.

With the cylindrical housing 7 installed in the chassis, means are provided for conveniently operating the clutch mechanism therein from the driver's seat, including a bracket 76 fixed to the forward cross-member 3 to one side of which is pivotally mounted a shifting lever 77. An actuating rod 78 attached thereto by a yoke 79 extends rearwardly of the lever and is attached by a yoke 80 to an upstanding post 81 threaded into the rear end of the shifting rod 33. Pivotally mounted on the bracket 76 opposite the lever 77 is an operating lever 82 provided with a yoke 83 having elongated openings 84, a rod 85 keyed to the clutch fork 62 being pivotally mounted between the yoke 83 on a pin 86. The sprocket 48 may be operably connected by a chain belt 87 to a winch 88 or other driven apparatus mounted on the truck bed.

With the mechanism positioned as illustrated in Fig. 2, with the clutch jaws 56 engaging the mating jaws 60, the sprocket driving the winch would be rotated at a speed dependent on the selected gear ratio of the transmission, it being obvious that either of the three forward or one reverse gear ratios commonly provided, could be selected. However, with the splined sleeve 28 moved rearwardly to its limit, the shaft 12 is free to turn independently of the shaft 13 thus preventing transmission of power to the rear or driving wheels. Forward movement of the lever 82 disengages the clutch jaws, thereby causing a cessation of power to the sprocket and pump. Forward movement of the lever 77 slides the splined sleeve into engagement with the splined portion 17 thereby effecting an integral shaft and a direct drive to the rear wheels. Should it be desirable to drive the winch during travel of the truck, the clutch jaws are again engaged and power is transmitted simultaneously to both the winch and driving wheels.

What I claim and desire to secure by Letters Patent is:

1. In a device of the character described a housing, shaft sections journaled in and projecting from the housing, a driving member rotatably mounted on the projecting end of a shaft section and having clutch jaws, means for selectively effecting an integral or independent relation of the shaft sections, a mating clutch member keyed against rotation but slidably mounted on the shaft section adjacent the driving member, and means for engaging or disengaging the driving member and mating clutch member.

2. In a device of the character described a housing, shaft sections journaled in and projecting from the housing, including means for retaining linear relation of the shafts, splined portions on the shaft, a splined sleeve slidable on the splined portions for selectively effecting an integral or independent relation of the shaft sections, a driving sprocket rotatably mounted on the projecting end of a shaft section and having clutch jaws, a cooperating clutch member keyed against rotation but slidably mounted on the shaft section adjacent the driving sprocket and means for engaging or disengaging the driving sprocket and cooperating clutch member.

3. In a device of the character described a housing, shaft sections journaled in and projecting from the housing, including means for retaining linear relation of the shafts, splined portions on the shaft, a splined sleeve slidable on the splined portions for selectively effecting an integral or independent relation of the shaft sections, means for sliding the sleeve and locking it in selected position, a driving sprocket rotatably mounted on the projecting end of a shaft section and having clutch jaws, a cooperating clutch member keyed against rotation but slidably mounted on the shaft section adjacent the driving sprocket and means for engaging or disengaging the driving sprocket and cooperating clutch member.

In testimony whereof I affix my signature.

JOHN R. HICKS.